United States Patent [19]

Porcher

[11] Patent Number: 5,428,290
[45] Date of Patent: Jun. 27, 1995

[54] VARIABLE RELUCTANCE ABSOLUTE ANGULAR POSITION SENSOR WITH SECTORED HOUSING AND ROTOR

[75] Inventor: Yves Porcher, Franconville, France

[73] Assignee: Societe D'Applications Generales D'Electricite Et De Mecanique Sagem, Paris, France

[21] Appl. No.: 980,960

[22] Filed: Nov. 24, 1992

[30] Foreign Application Priority Data

Nov. 26, 1991 [FR] France ............................. 91 14577

[51] Int. Cl.⁶ ................................................ G01B 7/30
[52] U.S. Cl. .......................... 324/207.16; 324/207.25
[58] Field of Search .................... 324/207.16–207.25, 324/236, 234, 207.13

[56] References Cited

U.S. PATENT DOCUMENTS

| | | | |
|---|---|---|---|
| 3,961,243 | 6/1976 | Schulz | 324/207.19 |
| 4,384,252 | 5/1983 | Kolter | 324/207.16 X |
| 4,612,503 | 9/1986 | Shimizu et al. | 324/208.18 |
| 4,743,786 | 5/1988 | Ichikawa et al. | 324/207.17 X |
| 4,777,436 | 10/1988 | Fiori, Jr. | 324/207.17 |
| 4,841,245 | 6/1989 | Fiori, Jr. | 324/207.18 X |
| 4,914,390 | 4/1990 | Orlicki et al. | 324/207.17 |
| 5,025,213 | 6/1991 | Dobler et al. | 324/207.25 X |
| 5,107,212 | 4/1992 | Dobler et al. | 324/207.19 X |
| 5,175,497 | 12/1992 | Dobler et al. | 324/207.25 |
| 5,323,109 | 6/1994 | Mehnert et al. | 324/207.17 |

FOREIGN PATENT DOCUMENTS

| | | |
|---|---|---|
| 2644240 | 9/1990 | France . |
| 2677757 | 12/1992 | France . |
| 2432032 | 1/1976 | Germany . |
| 4102478 | 5/1991 | Germany . |
| 1245697 | 9/1971 | United Kingdom . |

OTHER PUBLICATIONS

Patent Abstracts of Japan; "Rotor Magnetic Circuit of Device For Measuring Relative Displacement Angle"; vol. 7, No. 266 (P-239) (1411) 26 Nov. 1983 & JP-A-58 147 609 (MAEKAWA SEISAKUSHO KK) 2 Sep. 1983.

Primary Examiner—Sandra L. O'Shea
Assistant Examiner—Warren S. Edmonds
Attorney, Agent, or Firm—Larson and Taylor

[57] ABSTRACT

A variable reluctance absolute angular position sensor, having at least one stator detector (2). The dector includes: at least one stationary magnetic circuit (4, 4', 4") of ferromagnetic material provided with a length of annular housing (5, 5', 5"), and extending over an angular sector α; and at least one annular winding (6) housed in part in the annular housing; and at least one rotor unit (3) comprising at least one annular segment (7) of ferromagnetic material extending over an angular sector β of no more than 360°−α, and situated facing the winding (6) and being rotated coaxially with the winding (6) while facing the winding in such a manner that magnetic flux passes radially between the stator detector (2) and the rotor unit (3).

15 Claims, 8 Drawing Sheets

VARIABLE RELUCTANCE ABSOLUTE ANGULAR POSITION SENSOR WITH SECTORED HOUSING AND ROTOR

The present invention relates in general to the field of absolute angular position sensors, and more specifically it relates to improvements applied to variable reluctance absolute angular position sensors.

Numerous embodiments are already known of devices that enable the function of detecting absolute angular position to be performed. For example, a sensor may be constituted by one or more wound stationary magnetic circuits (of the type comprising wound pot cores or small wound U-shaped circuits) forming a stator, and rotary portions (non-wound rotor), and the detection function is initiated by local variation in the size of the air gap present in the magnetic circuit(s) defined by the stator and the rotor. Examples of such sensors may be found, in particular, in document DE-A-2 432 032 which describes a sensor that includes an eccentric disk rotating past a plurality of windings fixed to a core, in document GB-A-1 245 697 which describes a sensor comprising a turntable having a sloping face and rotating past a plurality of windings, in document FR-A-2 644 240 which describes sensors analogous to the above sensors, and in French patent application FR 91 07 229 in the name of the Assignee which describes a sensor comprising a rotary ring of angularly varying radial section engaged in a U-shaped detector.

The angle-sensing portions of the device (stationary magnetic circuits, windings, moving magnetic circuit, and air gaps defined between the moving and stationary magnetic circuits) are geographically very localized, and as a result the position-sensitive parameter (reluctance that varies as a function of angular position) is itself generated in a highly localized manner: it is therefore sensitive to local defects in the manufacture of the moving magnetic circuit (rotor), and also in the local uniformity of the material from which it is made. Mechanical defects (in the rotor and/or in the stator) therefore give rise to dispersion in the characteristics of the electrical signal that is picked up (a local error in the signal compared with an ideal signal) which can often be corrected if the error is generic to the device, but which is much more difficult, or even impossible to correct if caused by a spot manufacturing defect, such that the signal as picked up includes a disturbing noise signal superposed on the useful signal.

Furthermore, although it can be highly advantageous in a sensor of this kind to provide for permeance (the reciprocal of reluctance) to vary linearly as a function of angular position and thus to obtain linear variation in its self-induction, such linearity can be obtained inmost cases only by giving the mechanical parts that move relative to each other (and in particular the rotor) shapes that are complex (in particular parts that rotate about an eccentric axis, and surfaces that are inclined). It is not simple to manufacture such special parts, particularly since accurate sizes of air gap must be obtained after assembly, so manufacture is expensive.

In certain types of sensor, the detectors are constituted by small windings wound on U-shaped core pieces. In general, such windings do not correspond to any standard coil, so the windings need to be made on request using special tooling. This means that they are relatively expensive.

A particular object of the invention is to provide an improved type of variable reluctance absolute angular position sensor which gives better satisfaction than prior art sensors to various technical requirements and which, by its structure and ease of manufacture, is suitable for widespread use so as to make generally available the technological advantages that have hitherto been available only to top-of-range apparatuses of relatively high cost.

To these ends, a variable reluctance absolute angular position sensor organized in accordance with the invention is essentially characterized in that it comprises:
  at least one stator detector comprising:
    at least one stationary magnetic circuit of ferromagnetic material provided with a length of annular housing, and extending over an angular sector $\alpha$; and
    at least one annular winding housed in part in said annular housing;
  and at least one rotor unit comprising at least one annular segment of ferromagnetic material extending over an angular sector $\beta$ of no more than 360° $-\alpha$, and situated facing the winding and being rotated coaxially with the winding while facing the winding in such a manner that magnetic flux passes radially between the stator detector and the rotor unit.

In such a device, permeance is:
  at a minimum when the annular segment of the rotor is situated outside the stationary magnetic circuit of the stator;
  variable when the annular segment is partially engaged in the stationary magnetic circuit, occupying positions that are asymmetrical relative thereto; and
  at a maximum when the annular segment is fully engaged in the stationary magnetic circuit.

The curve showing how permeance (and thus self-induction) varies thus has a succession of sawteeth of shape (slope, amplitude) and mutual spacing that depend, in particular, on the geometrical configuration of the stationary magnetic circuit and of the rotary annular segment (relative values of the angles $\alpha$ and $\beta$). In a configuration that is approximately symmetrical ($\alpha \approx \beta \approx 180°$) the electrical signal has the appearance of a continuous sawtooth with peaks and troughs that are more or less rounded.

From a structural point of view, all of the parts are coaxial so manufacture and assembly are considerably simplified, particularly since the special shapes (sloping faces) provided in certain prior art sensors do not occur in this case. Finally, the windings are of conventional design.

The annular housing for the winding may be constituted by an annular groove formed in the stationary magnetic circuit which is then in the form of an angular sector of a conventional ferromagnetic pot core.

The rotary annular segment may be capable of engaging in the annular housing of the stator magnetic circuit during the course of its rotation (thereby providing a compact structure), or else it may remain outside said annular housing. Numerous dispositions are thus available, making it possible to satisfy all kinds of special requirements with a high degree of flexibility.

Above all, the fundamental structure of the sensor of the invention makes it simple to use cells having multiple detectors. Thus, the stator magnetic circuit may comprise a plurality of annular housings and a plurality of annular windings partially received in respective ones of said housings. Under such circumstances, the stator magnetic circuit may be organized in such a manner that at least some of the housings are mutually offset angularly. Similarly, the rotor member may comprise a plurality of rotor annular segments that are inductively associated with respective ones of the windings. Under such circumstances, at least some of the annular segments can be mutually offset angularly.

Such a wide range of available dispositions makes it possible to design sensors that accurately satisfy special requirements. By using a multiplicity of cells, it is possible to pick up a plurality of output signals that can be used independently or, on the contrary, by providing angular offsets in the stationary magnetic circuit and/or in the annular segments, and in particular by providing regular circumferential dispositions (offsets of 180° for two cells, 120° for three cells, or 90° for four cells, for example), it is possible to obtain signals that are phase shifted and that are used in combination, e.g. to overcome uncertainty concerning the value of an angular position in the vicinity of a peak (or a trough) in the characteristic curves (rounded peaks and troughs) and to make use only of the middle regions of the slopes where linearity is at a maximum.

It is also possible to arrange for each winding to be associated with a plurality of stator magnetic circuits, and the lengths of the various annular housings need not be equal (to simplify the description below, each length of annular housing is referred to as a "pole" even though, properly speaking, the term "pole" is inappropriate). It is thus possible to increase the frequency of the electrical signal as output for a given speed of rotation of the rotor, or else to combine a plurality of different items of information in a single signal.

It will readily be understood from the above that the drawbacks of prior art sensors are avoided in the sensor of the invention and that all of the above-mentioned looked-for advantages are obtained. It is nevertheless appropriate, at this point, to mention an additional advantage relating to the use of such absolute angular position sensors as rotary variable differential transformer type sensors (RVDT). Prior art sensors having two pairs of "poles" have a theoretical angular limit of ±45°, whereas a sensor of the invention with a single pair of "poles" makes it possible to obtain an operating limit of ±90°, thereby doubling the range of angles that can be measured.

The invention will be better understood on reading the following description of certain embodiments given purely a way non-limiting, illustrative examples. In the description, reference is made to the accompanying drawings, in which.

Figure 1:
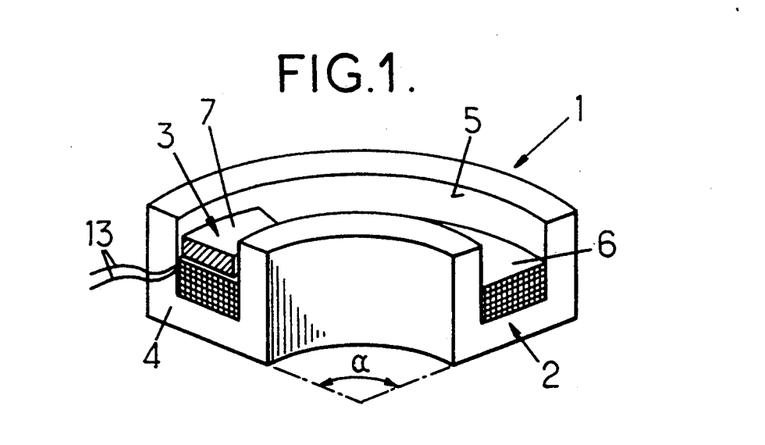
FIG. 1 is a perspective section view of a first embodiment of an absolute angular position sensor made in accordance with the invention.
Figure 2:
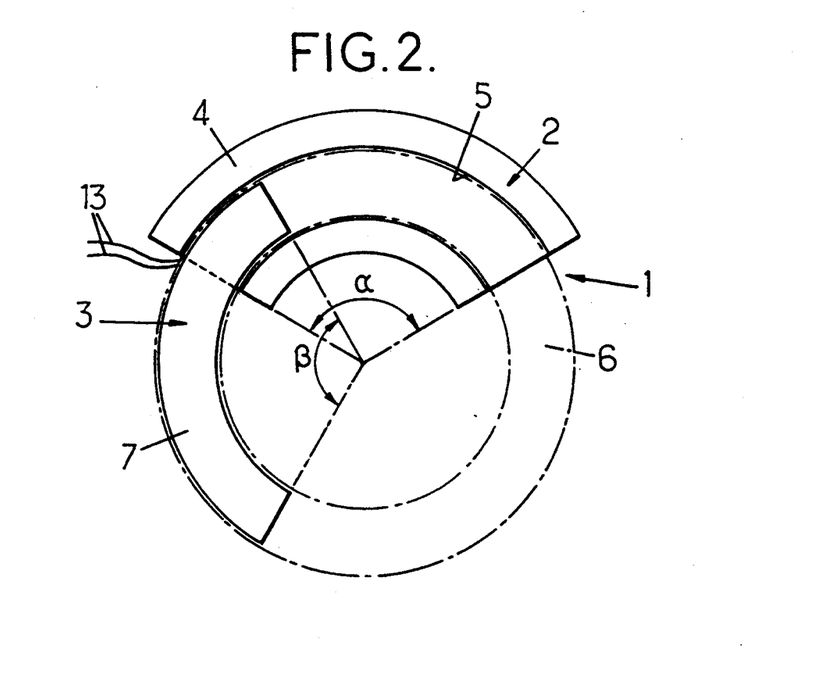
FIG. 2 is a plan view of the FIG. 1 sensor.

With reference initially to FIGS. 1 and 2, an absolute angular position sensor given overall numerical reference 1 comprises a stator 2 and a rotor 3 that are coaxial.

The stator 2 comprises a stationary magnetic circuit 4 made of ferromagnetic material, and in the form of an annular segment extending over an angle a. This magnetic circuit has a length of annular groove 5 formed therein and extending over the same angle $\alpha$. Its overall appearance is thus that of a conventional ferromagnetic pot core that has been cut along two radial planes at an angle $\alpha$.

The length of groove 5 constitutes a housing that holds a full annular winding 6 that is coaxial with the pot core 4 and that is held in position by any suitable means (not shown).

The rotor 3 comprises an elongate part 7 in the form of an annular segment, made of ferromagnetic material, and extending over an angular sector $\beta$ that is not greater than $360° - \alpha$. This annular segment 7 is supported by means that are not shown to face the winding 6, in a position coaxial with the housing 5 and in such a manner as to enable it to be rotated coaxially with the housing 5.

In the example shown in FIGS. 1 and 2, the annular segment 7 is engaged inside the groove or housing 5 and therefore extends radially by an amount that is significantly smaller than the radial width of the groove 5. The construction obtained in this way has the advantage of presenting an axial extent (height) that is relatively small, and that is therefore compact.

As can be seen in FIGS. 1 and 2, the groove 5 is open in the axial direction (upwards in FIGS. 1 and 2).

Figure 3A:
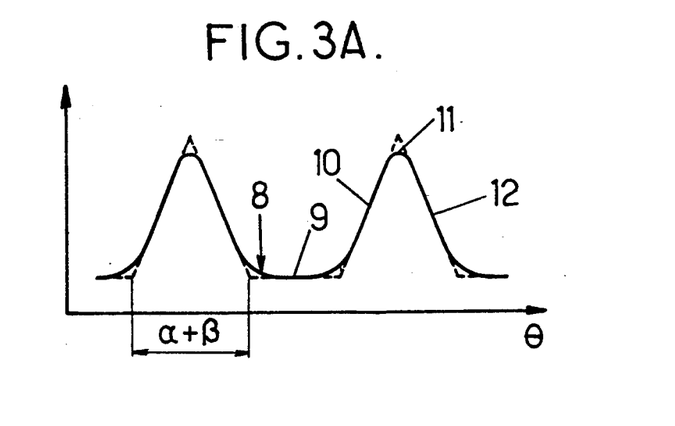
FIGS. 3A, 3B, and 3C are waveform diagrams showing electrical signals of the kind that can be obtained using the sensor of FIGS. 1 and 2.
Figure 3B:
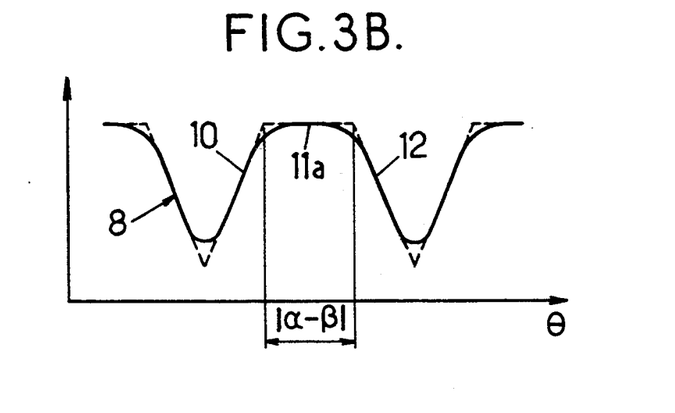
Figure 3C:
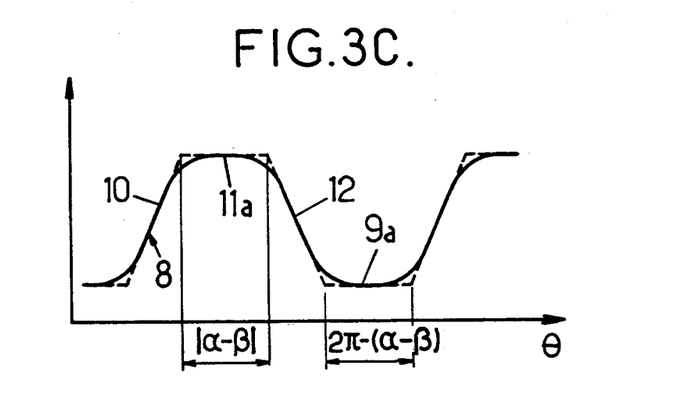

The sensor 1 made in this way forms a variable reluctance cell whose permeance P varies as a sawtooth as shown by curve 8 in FIGS. 3A to 3C (with the self-inductance of the winding 6 varying likewise). In FIG. 3A, $\alpha = \beta$ with $(\alpha+\beta) < 360°$. So long as the rotating annular segment 7 of the rotor lies completely outside the stator magnetic circuit 4, permeance is at its minimum value (portion 9 of curve 8). As soon as the annular segment of the rotor begins to engage in the groove 5, permeance increases (portion 10 of curve 8) until it reaches a maximum value (portion 11 of curve 8) which is reached when the annular segment 7 of the rotor is completely disposed within the groove 5. Once the segment 7 begins to leave the groove 5, the value of the permeance decreases (portion 12 of curve 8). Under the influence of magnetic end effects that occur when the annular segment 7 of the rotor is about to enter or leave the groove 5, the changes in slope of the curve 8 are not sudden (sharp angles) but progressive (rounded shapes).

In FIG. 3B, $\alpha$ is not equal to $\beta$ and $(\alpha+\beta)=360°$. If the annular segment 7 of the rotor extends over an angle $\beta$ that is not equal to the angle $\alpha$, while the sum $\alpha+\beta$ is equal to 360°, then permeance reaches a maximum value as soon as the rotor segment 7 occupies the entire stator groove 5, and it retains this maximum value so long as the segment 7 continues to occupy the entire groove 5 (curve having a flat maximum value 11a).

In FIG. 3C, $\alpha$ is not equal to $\beta$ and $(\alpha+\beta)<360°$. When the angles $\alpha$ and $\beta$ are different, as above, but their sum is less than 360°, permeance retains its maximum value so long as the rotor segment 7 fully occupies the stator groove 5 (curve having a flat maximum value 11a, as above), and permeance retains its minimum value so long as the rotor segment 7 does not occupy the stator groove 5 at all (curve having a flat minimum value 9a).

When a constant rms current is applied to the terminals 13 of the winding 6, an electrical signal is obtained that is directly representative of the self-inductance and thus of the permeance, with the amplitude of said electrical signal varying as a function of the angle $\theta$ of the angular position of the rotor relative to the stator in compliance with a relationship that is identical for the permeance relationship described above.

Figure 4:
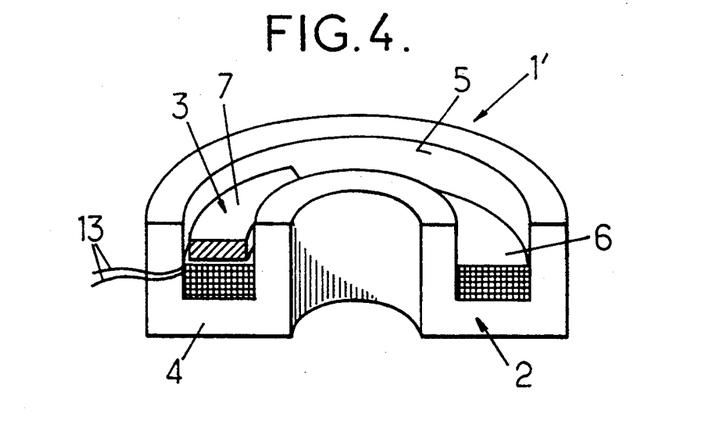
FIG. 4 is a perspective view in diametral section showing a variant of the sensor shown in FIGS. 1 and 2.
Figure 5:
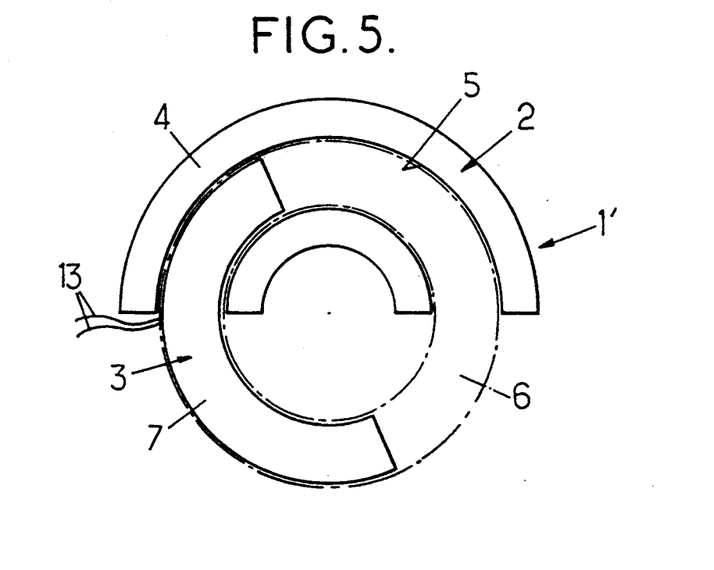
FIG. 5 is a plan view of the FIG. 4 sensor.
Figure 6:
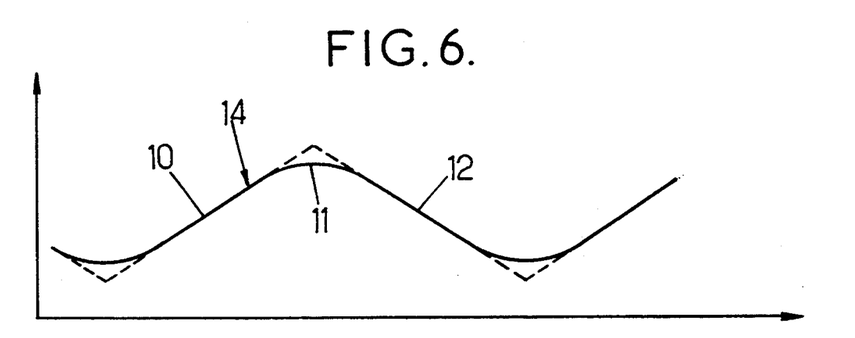
FIG. 6 is a waveform diagram of the electrical signal that can be obtained using the sensor of FIGS. 4 and 5.

FIGS. 4 and 5 (which retain the same numerical references for designating items that are identical to the items shown in FIGS. 1 and 2) show a particular embodiment in which $\alpha=\beta=180°$. In other words, the pot core 4 is semi-annular and the segment 5 is likewise semi-annular. The sensor 1' made in this way has the advantage of providing an output signal that is triangular in appearance (with rounded angles) corresponding to the permeance variation curve 14 of FIG. 6. The large amplitude obtained using this configuration has the advantage that the stroke has up and down slopes 10 and 12 having linear portions that are long.

Naturally the basic structure shown in FIGS. 1 and 2 and in FIGS. 4 and 5 can be modified in various different ways to give rise to different axial and/or radial sizes while the signals obtained at the terminals of the coil remain substantially identical.

Figure 7:
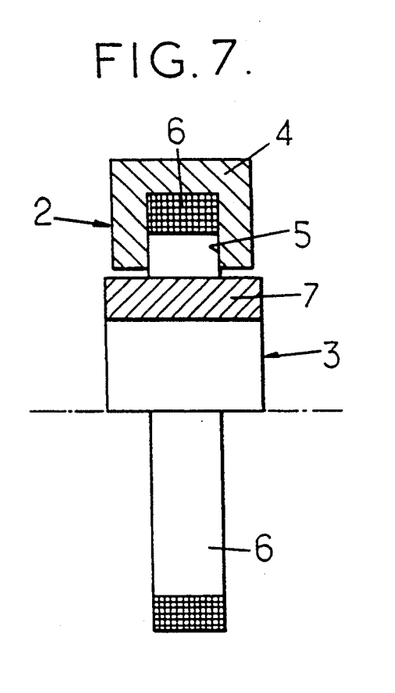
FIGS. 7 and 8 are highly diagrammatic diametral section views of other possible embodiments constituting variants of the sensor shown in FIG. 1.

Thus, FIG. 7 shows a variant in which the annular segment 7 of the rotor is inside the stationary magnetic circuit 4. The groove 5 is radially open on its inside and the angular segment of the rotor overlies the inside edges of the groove.

Figure 8:
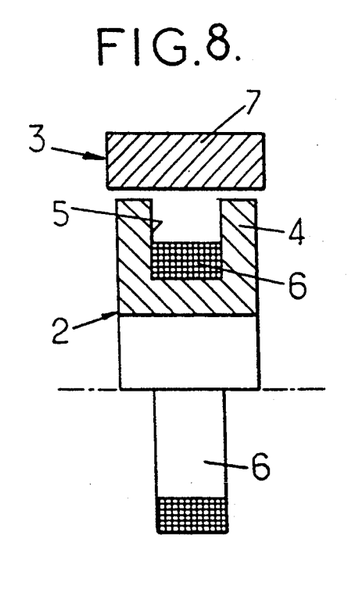

FIG. 8 shows another variant in which the annular segment 7 of the rotor is outside the stationary magnetic circuit 4. The groove 5 is radially open towards the outside.

Other dispositions are also possible and it will be understood that this provides a high degree of flexibility for the basic structure enabling it to be adapted so as to satisfy all kinds of special requirements in different applications.

This basic structure also has the advantage of lending itself easily to making sensors having a plurality of cells, i.e. having a stator that comprises a plurality of stators that are secured to one another in fixed predetermined angular positions, and a common rotor having a plurality of respective annular rotor segments, likewise disposed in fixed mutual angular positions and caused to rotate at the same angular velocity since they are all secured to the same rotary shaft.

The output signals from the various cells of the sensor can then be used individually and separately, or on the contrary, with the various stator and/or rotor annular segments being located in appropriate mutual dispositions, they can be used together in their respective linear regions so as to extend the range of angles over which the sensor responds linearly.

Figure 9:
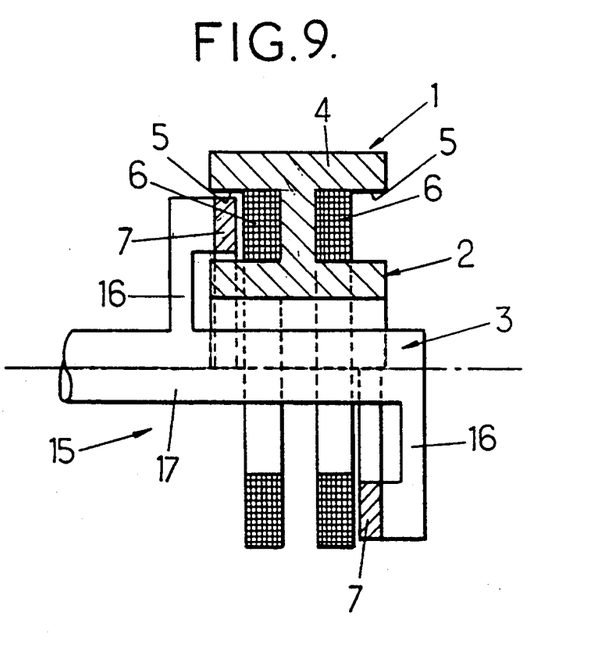
FIG. 9 is a highly diagrammatic diametral section view of a sensor in accordance with the invention and having a plurality of cells.

FIG. 9 shows a sensor 15 having two cells 1 of the type shown in FIGS. 1 and 2 (or in FIGS. 4 and 5), with the stator magnetic circuits 4 being mounted coaxially and back-to-back, and with the two rotor annular segments 7 being supported by respective radial arms 16 projecting from a common rotor shaft 17, the segments, the arms, and the shaft together constituting the rotor 3. In the example shown, the two stator magnetic circuits occupy the same angular position.

FIGS. 10 to 12 and 14 show four respective electrical circuits illustrating various possible ways in which the sensor 15 of FIG. 9 can be connected to perform various types of detection.

Figure 10:
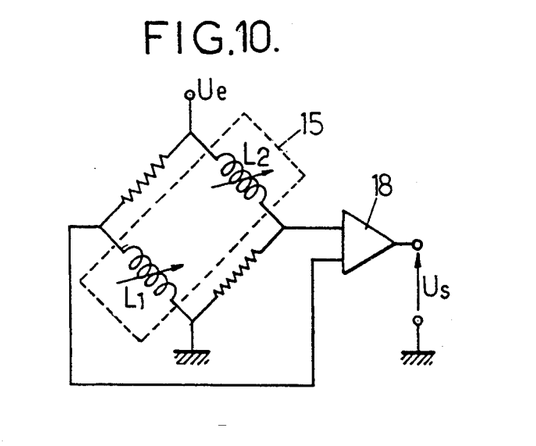
FIGS. 10 to 12 are circuit diagrams showing various possible electrical circuits for use with the sensor of FIG. 9.

FIG. 10 shows a bridge circuit enabling differential measurement to be performed. Unlike the configuration shown in FIG. 9, the two annular rotor segments 7 are disposed in the same angular position on the shaft 17 (in-phase position), such that the two output signals from the two cells 1 of the sensor 15 are electrically in phase. The two windings 6 (whose respective variable inductances are referenced L1 and L2 in FIG. 10) are included in two respective opposite branches of a bridge, and the two output signals are compared by means of a comparator 18 that provides a differential signal Us.

Figure 11:
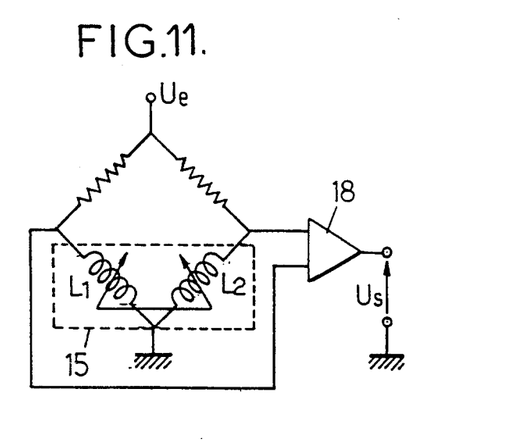

For the circuit shown in FIG. 11, the two annular rotor segments 7 of the sensor 15 are mounted on the shaft 17 so that they are diametrically opposite (as shown in FIG. 9). The output signals from the two cells are then in phase opposition. The two windings 6 are now included in two consecutive branches of a bridge circuit and their respective output signals are applied to a comparator 18 which thus provides a differential signal Us under the same conditions as in the circuit of FIG. 10.

Figure 12:
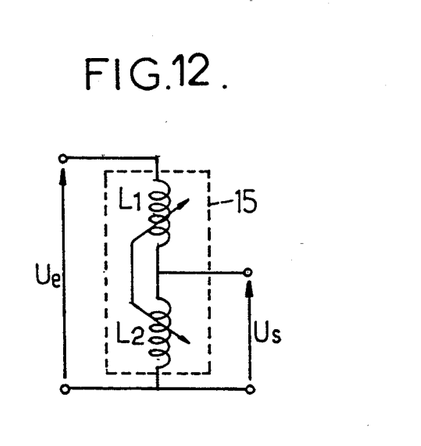

In the circuit of FIG. 12, the two annular rotor segments 7 are in phase opposition (arrow shown in FIG. 9) such that the sum L1+L2 remains constant. The two windings 6 are connected in series to the terminals of a voltage source Ue and the output signal Us is measured across the terminals of one of the windings 6. This circuit provides a ratio type measurement, i.e. a potentiometer type measurement.

Figure 13:
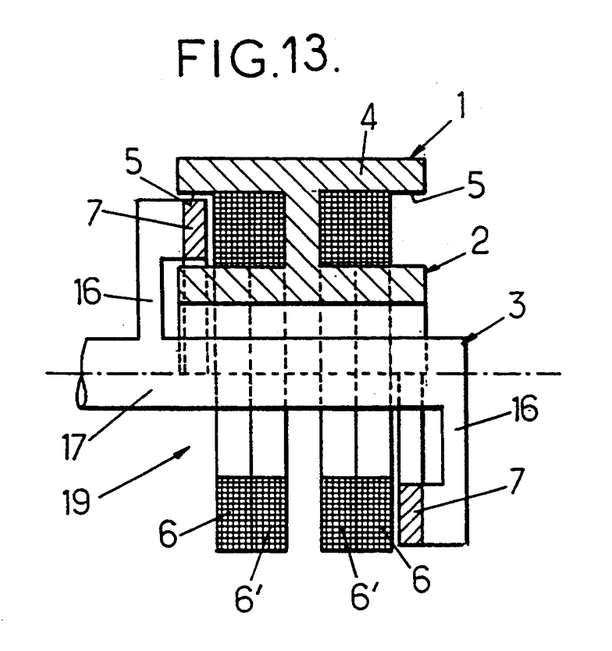
FIG. 13 is a highly diagrammatic diametral section view of another multi-cell sensor of the invention.
Figure 14:
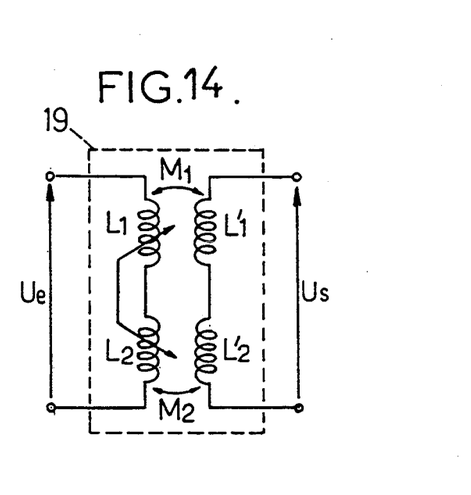
FIG. 14 is an electrical circuit diagram showing one possible way of connecting the electrical circuit of the FIG. 13 sensor.

The electrical circuit of FIG. 14 enables the sensor to be used for performing a differential transformer type measurement similar to that of RVDT operation. To do this, the two-cell sensor 15 of FIG. 9 retains its general structure having two diametrically opposite annular rotor segments, except in that each winding 6 is split into two, i.e. is replaced by a first winding 6 situated facing the associated rotor segment 7 plus a second winding 6' which is inductively coupled to the first winding 6 (see sensor 19 in FIG. 13). The respective self-inductances are designated L1 and L'1 for one pair of windings and L2 and L'2 for the other pair of windings in FIG. 14. Compared with a prior art RVDT sensor, the disposition of the invention provides the advantage of simplicity of implementation, which is a characteristic of the fundamental structure of a sensor of the invention (solid magnetic circuits, windings that are circular and can therefore be made independently of the magnetic circuit, parts that are circularly symmetrical), and also the advantage of the working range being doubled since the signals picked up remain linear over a range of about 160° (instead of about 80° for prior art sensors).

Figure 15:
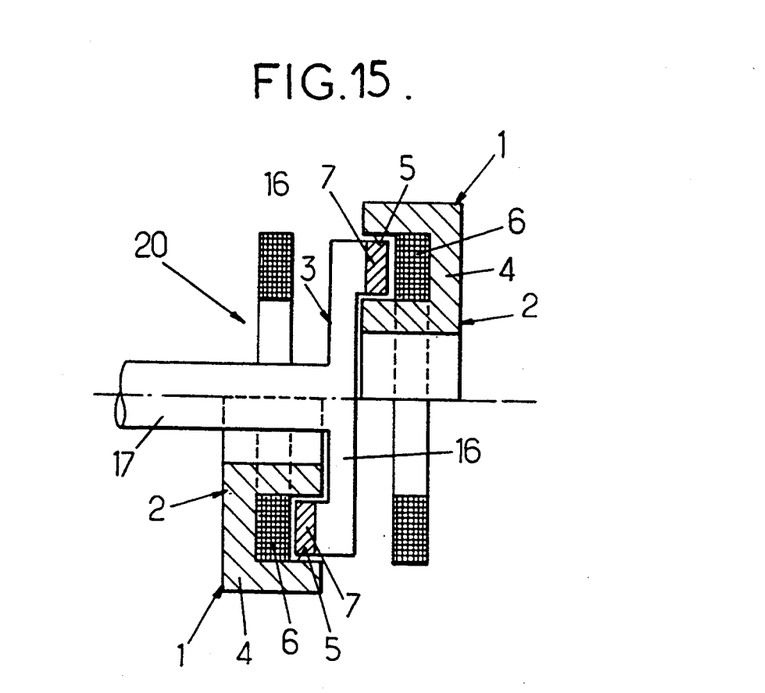
FIG. 15 is a highly diagrammatic diametral section view of yet another variant sensor in accordance with the invention and having a plurality of cells.

AS a further illustration of the flexibility with which the structure of a sensor of the invention can be adapted to special requirements, FIG. 15 shows a variant 20 of the two-cell sensor 15 of FIG. 9, in which variant the two stator magnetic circuits 4 are no longer back to back (FIG. 9), but are face to face, and are also axially offset from each other so that the annular rotor segments 7 carried by the shaft 17 rotate between the stator circuits. By way of example, the two stator magnetic circuits may be mutually offset by an angle of 180° and the two annular rotor segments 7 are mounted on the shaft 17 so as to be diametrically opposite (offset of 180°), thereby causing the respective output signals from the two cells to be electrically in phase. The sensor 20 may be subjected to the same structural modifications as the sensor 15 of FIG. 9 and can be used under the same conditions, such that the electrical circuit diagrams of FIGS. 10 to 12 and 14 are likewise applicable thereto.

Figure 16:
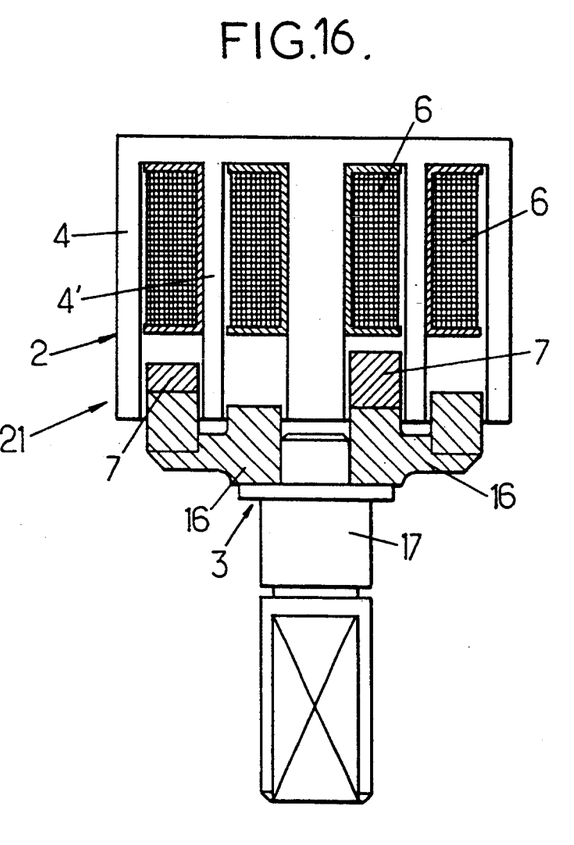
FIG. 16 shows another variant sensor having a plurality of concentric cells, the sensor being shown in diametral section.
Figure 17:
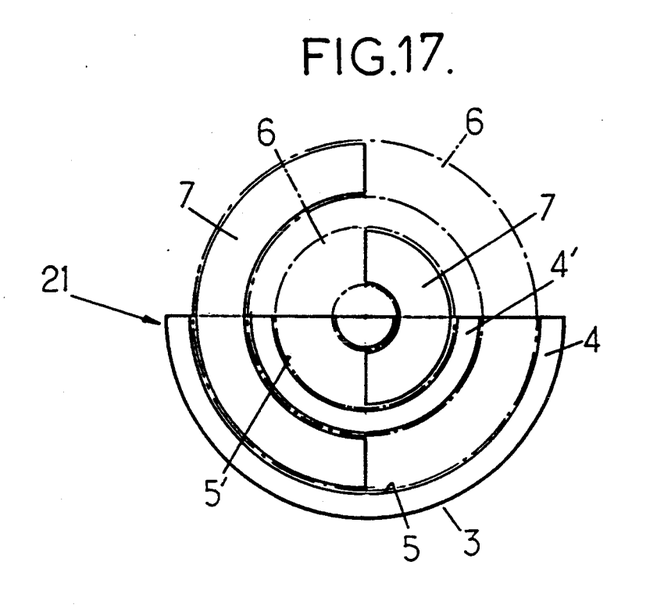
FIG. 17 is a diagrammatic plan view of the sensor of FIG. 16.

FIGS. 16 and 17 show yet another two-cell sensor 21 in which the two cells are concentric instead of being juxtaposed axially as in the embodiments of FIGS. 9, 13, and 15. By way of example, the two stator magnetic circuits 4 and 4' coincide angularly while the annular rotor segments are diametrically opposite. In addition, FIG. 16 shows, by way of example, a concrete disposition of the sensor 21 in relatively detailed and complete manner.

The examples given above relate to two-cell sensors given purely by way of example and it should naturally be understood that the dispositions of the invention are equally applicable to making sensors having some other number of cells greater than 2.

Figure 18:
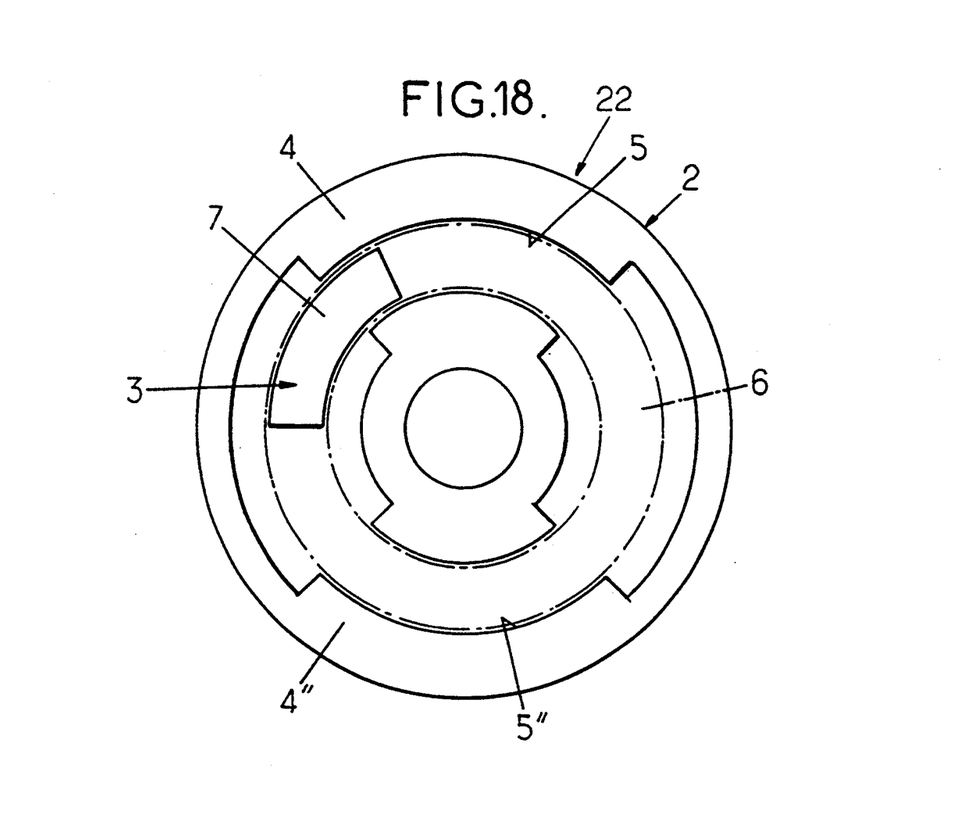
FIG. 18 is a highly diagrammatic plan view of a sensor or of a cell in a sensor of the invention having a plurality of "poles".

Furthermore, in the above examples, each sensor cell uses a single stator magnetic circuit or "pole" (in the above-defined meaning), and a single annular rotor segment. Nevertheless, it will naturally be understood that the periodicity of the signal obtained at the output from each cell can be increased by increasing the number of stator magnetic circuits (i.e. the number of "poles") and/or by increasing the number of rotor annular segments, and that this can be done in each cell. For example, the frequency of the signal shown in FIG. 3 can be doubled by replacing the single rotor annular segment 7 of the sensor 1 by two identical diametrically-opposite segments associated with the same "single-pole" stator magnetic circuit, or else by replacing the single stator magnetic circuit or the "single-pole" magnetic circuit by two diametrically-opposite stator magnetic circuits 4 and 4'' or by a "two-pole" magnetic circuit having poles that are diametrically opposite, in association with a single annular rotor segment. FIG. 18 is a diagrammatic plan view of a sensor 22 corresponding to the latter disposition. It is also possible to combine both of these dispositions (two annular rotor segments in association with a "two-pole" stator magnetic circuit).

It may also be observed that it is possible to make sensors that comprise a plurality of cells of different types.

Finally, although the magnetic circuits in each multicell sensor described above is taken as being independent components, the magnetic circuits, may, in practice, form portions of a single one-piece magnetic core shaped so as to define the said magnetic circuits having the required angular and radial positions.

Naturally, as can be seen from the above, the invention is not limited in any way to the particular applications and embodiments that have been described more particularly. On the contrary, the invention extends to any variants thereof.

I claim:

1. A variable reluctance absolute angular position sensor comprising:
   a stator detector including
      an annular winding having a central axial axis, and
      an annular housing extending over an angular sector $\alpha$ about the axial axis to form a stationary magnetic circuit, the annular housing having opposed free ends between which a portion of the annular winding is housed; and
   a rotor unit including
      an annular rotor segment of ferromagnetic material extending over an angular sector $\beta$ of no more than $360° - \alpha$ about the axial axis, the annular rotor segment being mounted for rotation about the axial axis in radial facing relation to the free ends of the housing when the annular rotor segment is adjacent to the free ends such that when a current is applied to the winding a magnetic flux passes radially between the stator detector and the rotor unit so that a measure of the magnetic flux determines a relative angular position about the axial axis of the annular housing and the annular rotor segment.

2. A sensor according to claim 1, wherein the annular rotor segment rotates in between the free ends of the annular housing.

3. A sensor according to claim 1, wherein the annular rotor segment passes axially outside of the free ends of the annular housing.

4. A sensor according to claim 1, wherein the annular rotor segment axially faces the winding.

5. A sensor according to claim 1, wherein the annular rotor segment axially faces the winding.

6. A sensor according to claim 1, wherein the stator detector includes a plurality of annular housings and a plurality of annular windings having a respective portion received between respective opposed free ends of said housings.

7. A sensor according to claim 6, wherein at least some of the housings are mutually offset angularly about the axial axis from one another.

8. A sensor according to claim 6, wherein the rotor unit includes a plurality of annular rotor segments inductively associated with respective ones of the windings.

9. A sensor according to claim 6, wherein the rotor unit includes a plurality of annular rotor segments inductively associated with respective ones of the windings and wherein at least some of the annular rotor segments are mutually offset angularly about the axial axis from one another.

10. A sensor according to claim 6, wherein the rotor unit includes a common rotary drive shaft to which the annular rotor segments are secured.

11. A sensor according to claim 1, wherein the stator detector includes two housings each of which extends over an angular sector $\alpha$ of about 180°.

12. A sensor according to claim 1, wherein the rotor unit includes two annular rotor segments each of which extends over an angular sector $\beta$ of about 180°.

13. A sensor according to claim 1, wherein the stator detector includes two annular housings associated with the winding.

14. A sensor according to claim 11, wherein the two annular housings are constituted in the form of a single one-piece magnetic core.

15. A sensor according to claim 1, wherein the rotor unit includes two annular rotor segments associated with the winding.

* * * * *